(12) United States Patent
Shimizu et al.

(10) Patent No.: US 7,405,560 B2
(45) Date of Patent: Jul. 29, 2008

(54) GMR ANGLE SENSOR FOR VEHICLES

(75) Inventors: Yoshikazu Shimizu, Miyagi-ken (JP);
Ichiro Tokunaga, Miyagi-ken (JP);
Kenji Honda, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/651,899

(22) Filed: Jan. 9, 2007

(65) Prior Publication Data
US 2007/0164734 A1   Jul. 19, 2007

(30) Foreign Application Priority Data
Jan. 18, 2006   (JP)   ............... 2006-009660

(51) Int. Cl.
*G01R 33/09* (2006.01)
*G01B 7/30* (2006.01)
(52) U.S. Cl. .............. 324/252; 324/207.21; 324/207.25
(58) Field of Classification Search ................. 428/814; 324/252, 207.21, 207.25, 249, 244; 338/32 R; 360/324, 324.1, 324.11, 324.12, 324.2, 326
See application file for complete search history.

(56) References Cited

U.S. PATENT DOCUMENTS

| 5,551,586 | A | 9/1996 | Uenoyama et al. | |
| 6,703,132 | B1* | 3/2004 | Yasuda et al. | 428/447 |
| 7,218,103 | B2* | 5/2007 | Kobayashi et al. | 324/252 |
| 2001/0024346 | A1 | 9/2001 | Terunuma et al. | 360/324.1 |
| 2002/0044398 | A1 | 4/2002 | Sasaki et al. | 360/324.12 |
| 2003/0058587 | A1 | 3/2003 | Hasegawa et al. | 360/324.12 |
| 2003/0103299 | A1 | 6/2003 | Saito | 360/324.12 |
| 2003/0197503 | A1 | 10/2003 | Kawano et al. | 324/207.21 |
| 2004/0157067 | A1* | 8/2004 | Kusumi et al. | 428/473.5 |

FOREIGN PATENT DOCUMENTS

| EP | 1286336 | 2/2003 |
| EP | 1536490 | 6/2005 |
| JP | 7-63505 | 3/1995 |
| JP | 8-70148 | 3/1996 |
| JP | 8-264861 | 10/1996 |
| JP | 11-287669 | 10/1999 |
| JP | 2000-180524 | 6/2000 |
| JP | 2000-213957 | 8/2000 |
| JP | 2002-107433 | 4/2002 |

OTHER PUBLICATIONS

European Search Report dated Jun. 13, 2007 for European application No. 07000690.3-2216.

* cited by examiner

*Primary Examiner*—Patrick Assouad
*Assistant Examiner*—David M. Schindler
(74) *Attorney, Agent, or Firm*—Beyer Law Group LLP

(57) ABSTRACT

A GMR angle sensor for vehicles includes a GMR element in which the element resistance is changed in response to an external magnetic field, lead conductors connected to either end of the GMR element, and a protective layer that seals the GMR element and the lead conductors, wherein the protective layer has a laminated structure including an oxidation-resistant inorganic film that ensures that the GMR element and the lead conductors are sufficiently insulated and a silicone-based organic film laminated on the inorganic film.

12 Claims, 3 Drawing Sheets

GMR ANGLE SENSOR FOR VEHICLES

BACKGROUND OF THE INVENTION

1. Field of the Invention

The present invention relates to a giant magnetoresistive (GMR) angle sensor for vehicles that includes a GMR element showing a significant change in resistance in response to a change in an external magnetic field.

2. Description of the Related Art

A GMR angle sensor is an angle sensor including a giant magnetoresistive element (GMR element) whose resistance significantly changes in response to a change in an external magnetic field. As is generally known, such a GMR element has a laminated structure of free magnetic layer/nonmagnetic conductive layer/pinned magnetic layer/antiferromagnetic layer. The magnetization direction of the pinned magnetic layer is pinned in one direction by an exchange coupling magnetic field generated at the interface with the antiferromagnetic layer. The magnetization direction of the free magnetic layer facing the pinned magnetic layer, with the nonmagnetic conductive layer provided therebetween, is rotated in response to an external magnetic field, and the resistance is changed in accordance with the angle formed by the magnetization direction of the pinned magnetic layer and the magnetization direction of the free magnetic layer. This GMR angle sensor includes an electrode layer connected to either end of the GMR element. When a certain amount of current is provided to the GMR element through the electrode layer, a change in resistance of the GMR element is detected as a change in voltage. The GMR element and the electrode layer (except for electrode pads) are sealed with a protective layer, and the protective layer is generally composed of an inorganic film such as a $SiO_2$ film.

Since the above GMR angle sensor can detect angles without being in contact with a movable portion (rotating portion), reliability and durability thereof are significantly higher than those of a contact-type angle sensor using sliding resistance. Therefore, application of the GMR angle sensor to an angle sensor for vehicles, for example, for detecting the steering angle of a steering wheel has been expected.

It is assumed that GMR angle sensors for vehicles are used in an environment in which the temperature varies over a wide range of at least about −40 to 160 degrees Celsius. Therefore, it is desired that the output characteristics of a GMR element do not fluctuate with change in the temperature in the operating environment, that is, the value of element resistance of the GMR element is stable regardless of the temperature in the operating environment. Examples of patent documents in the related art include Japanese Unexamined Patent Application Publication Nos. 8-70148, 8-264861, 11-287669, 2002-107433, 2000-213957, 2000-180524, and 7-63505.

However, although an inorganic film such as a $SiO_2$ film, which is used in known sensors, has excellent heat resistance, such an inorganic film does not satisfactorily meet the levels of moisture resistance and corrosion resistance required in the environment in which GMR sensors for vehicles operate. Therefore, in order to improve moisture resistance and corrosion resistance, it is believed that the use of an organic film is necessary.

For example, Japanese Unexamined Patent Application Publication Nos. 11-287669, 2002-107433, and 7-63505 describe that an organic film may be used as a protective film provided on a wafer. In these patent documents, a polyimide resin is used for the organic film.

However, since the curing temperature of polyimide resins is high, i.e., 300° C. or higher, if a polyimide resin were used to protect a GMR element, the GMR element would be exposed to a high temperature during curing of the resin after the formation of the film. Accordingly, characteristics of the GMR element may be degraded, and thus polyimide resins cannot be used to form protective films for GMR elements.

In order to improve heat resistance, moisture resistance, corrosion resistance, adhesiveness, and the like, not only the type of material of the protective film but also the structure of the protective film is important. However, the above patent documents do not describe the structure of such protective films in detail.

SUMMARY OF THE INVENTION

Accordingly, it is an object of the present invention to provide a GMR angle sensor for vehicles which includes an organic protective film formed without degrading characteristics of a GMR element, which has not only excellent heat resistance but also excellent moisture resistance and corrosion resistance, and in which variations in the output characteristics due to the operating environment are small.

According to the present invention, a GMR angle sensor for vehicles includes a giant magnetoresistive element in which the element resistance is changed in response to an external magnetic field, lead conductors connected to the giant magnetoresistive element, and a protective layer that seals the giant magnetoresistive element and the lead conductors, wherein the protective layer has a laminated structure including an inorganic film that ensures that the giant magnetoresistive element and the lead conductors are sufficiently insulated and a silicone-based organic film.

According to the GMR sensor for vehicles of the present invention, the protective layer of the GMR element includes at least two layers having an inorganic film and an organic film. The inorganic film ensures that the giant magnetoresistive element and the lead conductors are sufficiently insulated. Furthermore, the inorganic film has a low thermal conductivity. Therefore, even when the GMR sensor is used in a high-temperature environment, the inorganic film prevents a phenomenon in which the temperature of the GMR element is increased and the output characteristics of the GMR element fluctuate. The organic film is made of a silicone resin. The organic film prevents moisture and the like from the outside from penetrating in the GMR element, thus preventing corrosion of the GMR element. Furthermore, the curing temperature of the silicone resin is lower than that of polyimide resins. Therefore, degradation of characteristics of the GMR element due to heat can be suppressed even after the curing of the silicone resin. Accordingly, the present invention can provide a GMR angle sensor for vehicles which includes an organic film formed without degrading characteristics of the GMR element, which has not only excellent heat resistance but also excellent moisture resistance and corrosion resistance, and in which variations in the output characteristics due to the operating environment are small.

The organic film is preferably made of a silicone-based photosensitive resin that can be cured at 200° C. to 250° C. Characteristics of the GMR element are not degraded at 200° C. to 250° C., which is the curing temperature. Therefore, the silicone-based photosensitive resin that can be cured at 200° C. to 250° C. can be suitably used for the organic protective film of the GMR element.

Furthermore, the organic film preferably has a thickness of at least 5 μm. More preferably, the organic film has a thickness in the range of 5 to 10 μm. In such a case, recognition failure can be prevented in image recognition during wire-bonding or the like.

Since the organic film is made of a resin, the organic film may be formed by patterning using photolithography.

The inorganic film provided as the protective layer preferably includes a silica ($SiO_2$) film and an oxidation-preventing film laminated on at least one of the upper surface or the lower surface of the silica film. Accordingly, variations in the output characteristics due to the operating environment can be more appropriately suppressed. The oxidation-preventing film is preferably an alumina ($Al_2O_3$) film. Since alumina has low oxygen permeability, the formation of the alumina film can suppress oxidation of the GMR element.

In the present invention, the inorganic film is preferably provided on the giant magnetoresistive element and the lead conductors, and the organic film is preferably provided on the inorganic film. This structure can appropriately improve the adhesiveness between the protective layer, and the GMR element and the lead conductors, and the adhesiveness between a molding resin and the protective layer. The inorganic film is preferably provided between the organic film and the GMR element rather than the case where the organic film is provided directly on the GMR element. This is because the effect of heat on the GMR element during thermal curing of the organic film made of a silicone resin can be reduced, thus more appropriately suppressing degradation of the GMR characteristics.

According to the present invention, a GMR angle sensor for vehicles which includes an organic protective film formed without degrading characteristics of a GMR element, which has not only excellent heat resistance but also excellent moisture resistance and corrosion resistance, and in which variations in the output characteristics due to the operating environment are small can be obtained.

DESCRIPTION OF THE PREFERRED EMBODIMENTS

An embodiment in which a GMR angle sensor for vehicles according to the present invention is embodied as an angle sensor for detecting the steering angle of a steering wheel will now be described with reference to the drawings.

Figure 1:
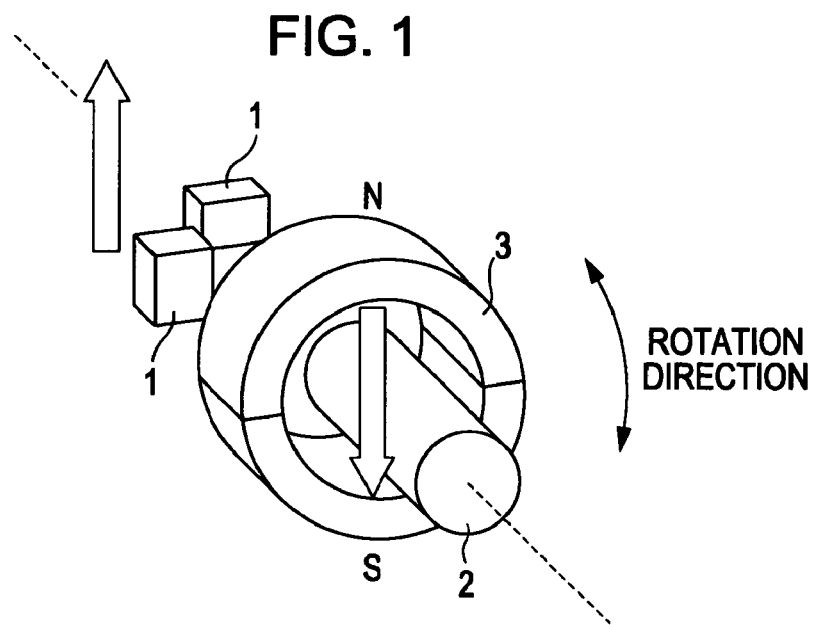
FIG. 1 is a schematic view illustrating angle detection by a GMR angle sensor for vehicles according to the present invention.

As shown in FIG. 1, a pair of GMR angle sensors 1 are fixed in a steering column of an automobile so as to have a positional relationship in which the GMR angle sensors 1 face a cylindrical rotation magnet 3 that rotates together with a steering shaft via a rotary shaft 2 so as to be parallel with each other and the magnetic field direction by means of the rotation magnet 3 is antiparallel to the magnetic field direction in the GMR angle sensors 1. The pair of GMR angle sensors 1 are disposed so that the rotational positions with respect to the rotation magnet 3 are shifted by 90 degrees. The rotation magnet 3 is magnetized so that the N-pole and the S-pole are polarized, and the direction connecting the N-pole and the S-pole corresponds to the radial direction. When a steering wheel is rotated by an operation, the steering shaft is rotated in response to the operation, and the rotary shaft 2 and the rotation magnet 3 are rotated in accordance with the rotation of the steering shaft. In this case, since the position of the pair of GMR angle sensors 1 is not changed, the relative position of the rotation magnet 3 and the GMR angle sensors 1 changes, and thus the direction of an external magnetic field applied to the GMR angle sensors 1 changes. The GMR angle sensors 1 include GMR elements 10 in which the element resistance is changed in response to a change in the external magnetic field. By supplying a certain amount of current to the GMR elements 10, the change in the external magnetic field is read out as a change in voltage. By performing a predetermined calculation on the basis of the outputs (voltage change signals) from the pair of GMR angle sensors 1, the steering angle of the steering wheel is uniquely detected.

Figure 2:
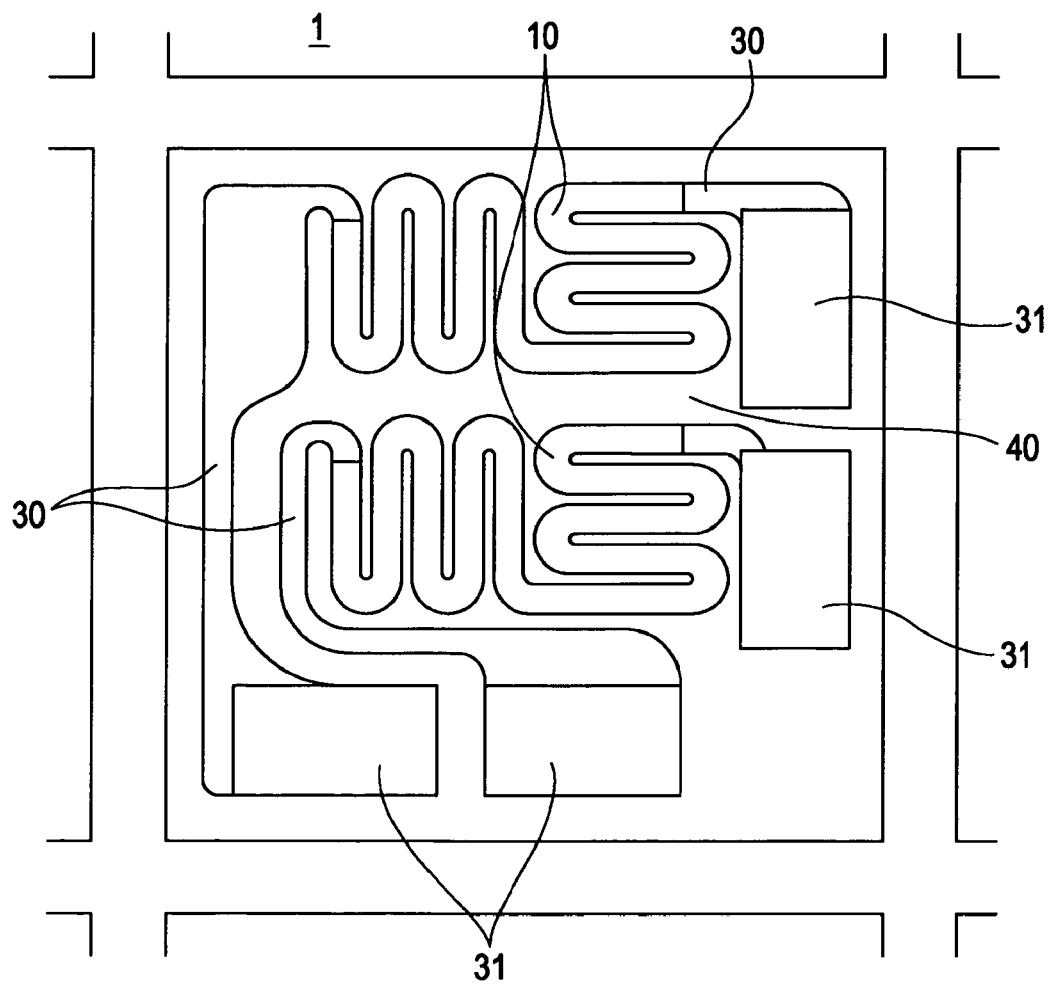
FIG. 2 is a plan view showing the schematic structure of the GMR angle sensor shown in FIG. 1.
Figure 3:
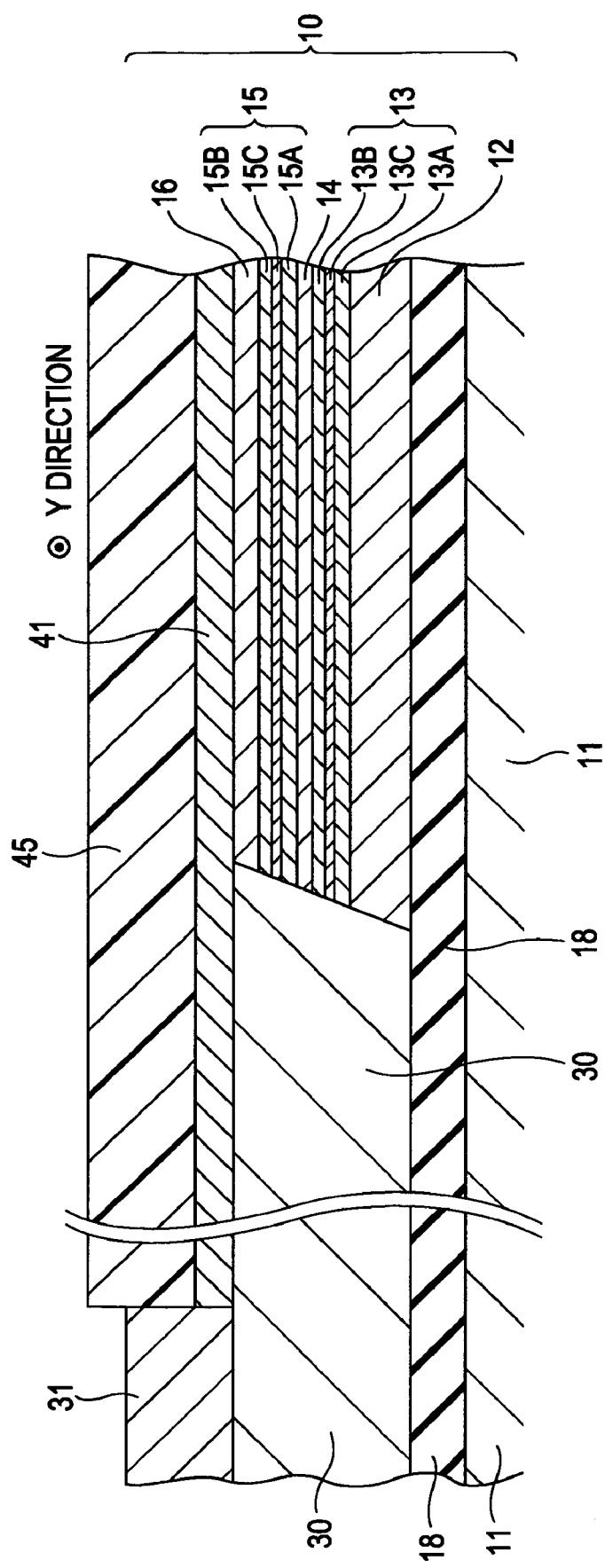
FIG. 3 is a cross-sectional view showing the schematic structure of the GMR angle sensor shown in FIG. 1.

FIGS. 2 and 3 are a plan view and a cross-sectional view, respectively, showing the schematic structure of one of the GMR angle sensors 1. The GMR angle sensor 1 includes a pair of GMR elements 10 that exhibit a giant magnetoresistive effect, lead conductors 30 connected to either end of each GMR element 10, Au electrode pads 31 provided at an end of the lead conductors 30, the end being opposite to the side connected to the element, and a protective layer 40 that covers and seal the GMR elements 10 and the lead conductors 30 and that exposes the Au electrode pads 31. This GMR angle sensor 1 includes two GMR elements 10, but the number of GMR elements 10 included is not particularly limited.

As shown in FIG. 3, the GMR element 10 is formed on a substrate 11 and an insulating layer 18 provided on the substrate 11. The GMR element 10 includes, from the substrate 11 side, an antiferromagnetic layer 12, a pinned magnetic layer 13, a nonmagnetic conductive layer 14, a free magnetic layer 15, and a cap layer 16 in that order and has a current-in-plane (CIP) structure in which a current flows parallel to the film surface.

The antiferromagnetic layer 12 is made of an IrMn alloy or a PtMn alloy. When the antiferromagnetic layer 12 is heat-treated, a large exchange coupling magnetic field is generated at the interface with the pinned magnetic layer 13, and the magnetization direction of the pinned magnetic layer 13 is pinned in the Y direction in the figure. The pinned magnetic layer 13 has a laminated ferrimagnetic structure in which a nonmagnetic sublayer 13C made of Ru, Rh, Cr, Re, Cu, or the like is provided between a first pinned magnetic sublayer 13A and a second pinned magnetic sublayer 13B that are made of Co, a NiFe alloy, a CoNi alloy, a CoFe alloy, a CoFeNi alloy, or the like. The magnetization of the first pinned magnetic sublayer 13A is pinned in the Y direction in the figure by an exchange coupling magnetic field generated at the interface with the antiferromagnetic layer 12. In the second pinned magnetic sublayer 13B that is magnetically coupled with the first pinned magnetic sublayer 13A, with the nonmagnetic sublayer 13C therebetween, the magnetization is pinned in a direction antiparallel to the magnetization direction of the first pinned magnetic sublayer 13A. This magnetization in a synthetic ferrimagnetic state is not changed even by an external magnetic field or high environmental temperatures and is thermally stabilized. Accordingly, the magnetization direction of the pinned magnetic layer 13 is not changed. Alternatively, the pinned magnetic layer 13 may be composed of a magnetic film that has a single-layer structure or a multilayered structure and that is made of a ferromagnetic material such as Co, a NiFe alloy, a CoNi alloy, a CoFe alloy, or a CoFeNi alloy. The nonmagnetic conductive layer 14 is made of a good conductive material such as Cu and has a function of magnetically separating the pinned magnetic layer 13 from the free magnetic layer 15. Instead of the nonmagnetic conductive layer 14, an insulating barrier layer made of, for example, $Al_2O_3$ may be used. In such a case, the GMR element 10 is a tunnel magnetoresistive (TMR) element that utilizes the tunnel effect. The free magnetic layer 15 has a laminated ferrimagnetic structure in which a first soft magnetic sublayer 15A and a second soft magnetic sublayer 15B that are made of a NiFe alloy or a CoFeNi alloy face each other, with a nonmagnetic sublayer 15C made of Ru, Rh, Os, Cr, or the like therebetween. According to this free magnetic layer 15 having the laminated ferrimagnetic structure, the magnetization is easily rotated by an external magnetic field to further improve the detection accuracy on the sensor. Alternatively, the free magnetic layer 15 may be a soft magnetic film having a single-layer structure made of NiFe or the like. Alternatively, the free magnetic layer 15 may have a two-layer structure including a soft magnetic sublayer made of a NiFe alloy or a CoFeNi alloy and a diffusion-preventing sublayer made of Co or a CoFe alloy. The diffusion-preventing sublayer is provided between the soft magnetic sublayer and the nonmagnetic conductive layer 14 and prevents Ni atoms of the soft magnetic sublayer from interdiffusing in the nonmagnetic conductive layer 14. However, in order to prevent the degradation of magnetic properties of the soft magnetic sublayer, the diffusion-preventing sublayer is formed so as to have a small thickness. The cap layer 16 is the top layer of the GMR element 10 and is made of Ta or the like. In the embodiment shown in FIG. 1, the lead conductors 30 are provided at either end of each GMR element 10. However, in a current perpendicular to the plane (CPP)-GMR element (or a TMR element), the lead conductors 30 are provided on and under the GMR elements 10.

A feature of the GMR angle sensor 1 having the above structure lies in the protective layer 40 sealing the GMR elements 10 and the lead conductors 30.

The protective layer 40 has a function of protecting the GMR elements 10 from oxidation and corrosion. Furthermore, when the GMR elements are separated from a wafer and packaged with molding in the production process, the protective layer 40 protects the GMR elements 10 from being scratched even if the GMR elements 10 are in contact with a package resin. In addition, the protective layer is required in order to increase the adhesiveness with the package resin.

Figure 4:
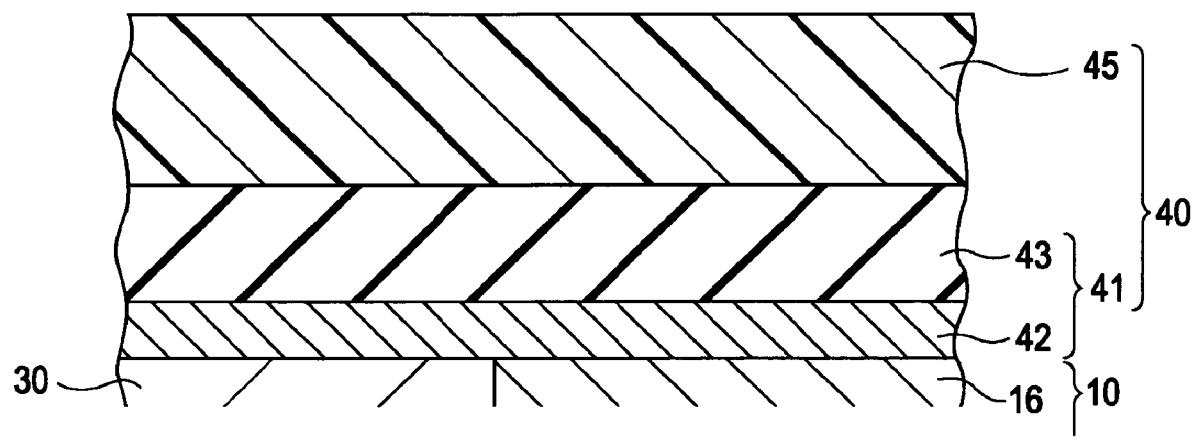
FIG. 4 is a cross-sectional view showing the structure of a protective layer of the present invention.

FIG. 4 is an enlarged cross-sectional view showing the structure of the protective layer 40. The protective layer 40 is a nonmagnetic insulating multilayer film and includes an inorganic film 41 covering the cap layer 16 and the lead conductors 30 of the GMR elements 10 and an organic film 45 laminated on the inorganic film 41. Alternatively, the organic film 45 may be provided on the cap layer 16 and the lead conductors 30 and the inorganic film 41 may be laminated on the organic film 45. However, preferably, the inorganic film 41 is provided on the cap layer 16 and the lead conductors 30, and the organic film 45 is provided on the inorganic film 41 because the adhesiveness of the organic film to the cap layer 16 and the lead conductors 30 of the GMR elements 10 is not high. In addition, as shown in FIG. 4, the organic film 45 is formed not directly on the GMR element 10 but the inorganic film 41 is formed between the organic film 45 and the GMR element 10, thereby reducing the effect of heat on the GMR element 10 during thermal curing of the organic film 45.

The inorganic film 41 includes an alumina ($Al_2O_3$) film 42 and a silica ($SiO_2$) film 43 laminated on the alumina film 42. The alumina film 42 physically separates the GMR element 10 from the silica film 43 and functions as an oxidation-preventing layer that prevents the surface oxidation of the GMR element 10. The silica film 43 has a function of ensuring insulation of the GMR element 10 and the lead conductor 30. The inorganic film 41 including only a silica film provides sufficient insulation. However, the silica film easily transmits oxygen, and the surface of the GMR element 10 may be oxidized under some operating conditions, thereby affecting the characteristics of the GMR element. Therefore, an alumina film is laminated as an oxidation-preventing layer on or under the silica film. The inorganic film 41 including only an alumina film can satisfactorily prevent the GMR element 10 from being oxidized. However, since only the alumina film does not provide sufficient insulation, a silica film is preferably laminated on or under the alumina film. When an alumina film and a silica film are laminated, the silica film may be laminated on the alumina film, or conversely, the alumina film may be laminated on the silica film. However, as in the embodiment shown in FIG. 4, a structure in which the silica film is laminated on the alumina film is preferably used. The reason for this is, for example, as follows. The silica film 43 easily transmits oxygen atoms, compared with the alumina film 42. Therefore, in the production process, preferably, the alumina film 42 is formed on the GMR element 10 and the silica film 43 is then formed on the alumina film 42, rather than the case where the silica film 43 is formed on the GMR element 10 and the alumina film 42 is then formed on the silica film 43. In such a case, oxidation of the GMR element 10 during the production process can be appropriately prevented. Furthermore, in a high-temperature environment, interdiffusion easily occurs at the interface between the silica film 43 and the GMR element 10. Therefore, in order to suppress the interdiffusion, the silica film 43 is preferably separated from the GMR element 10.

The alumina film 42 constituting the inorganic film 41 is formed on the GMR elements 10 and the lead conductors 30 by sputtering. Since alumina is harder than silica, it is sufficient that the thickness of the alumina film 42 is about 1,000 Å, which is smaller than the thickness of the silica film. In the embodiment shown in FIG. 4, the silica film 43 is formed on the alumina film 42 by sputtering. The silica film is formed by, for example, sputtering. However, any methods of forming a silica film, such as a sol-gel method using a silicon alkoxide, may also be employed. The thickness of the silica film formed is preferably larger than the thickness of the alumina film and is preferably in the range of 3,000 to 4,000 Å.

The structure of the inorganic film 41 is not limited to that of the embodiment shown in FIG. 4. For example, an inorganic film having a laminated structure composed of, from the bottom, silica film 43/Si film/insulating carbon film (or a laminated structure in which the order of the above films is reversed) may be formed on the GMR element 10. The film composed of Si film/insulating carbon film negligibly transmits oxygen atoms and does not allow oxygen atoms to intrude from the outside even in a high-temperature environment. Accordingly, the film composed of Si film/insulating carbon film as well as the alumina film 42 also functions as an oxidation-preventing layer. The Si film also functions as an adhesive layer for improving the adhesiveness between the silica film 43 and the insulating carbon film.

The organic film 45 is formed on the inorganic film 41 using an organic silicone resin. The organic silicone resin is a resin having a siloxane skeleton and has excellent electrical insulation and a low dielectric constant. Therefore, the organic silicone resin is suitable for forming the protective film. Furthermore, since strong covalent bonds are formed with a metal or an inorganic material during curing, the formed organic film can improve the adhesiveness with the inorganic film 41 made of alumina or silica or the cap layer 16 and the lead conductors 30 of the GMR elements 10. In addition, since the organic silicone resin has water repellency, the formed film does not easily transmit moisture and is excellent in terms of moisture resistance and corrosion resistance.

Among organic silicone resins, resins including a siloxane resin modified with a heat-resistant organic resin component as the basic skeleton are preferred. Since such resins including a siloxane resin modified with a heat-resistant organic resin component as the basic skeleton have a heat-resistant organic resin skeleton, the resins have high heat resistance. Among heat-resistant organic resin skeletons, the resins more preferably include a siloxane skeleton modified with a heat-resistant aromatic resin component. As regards such an organic silicone resin, a negative photosensitive material including a siloxane resin modified with a heat-resistant aromatic resin component as the basic skeleton is suitably used. More specifically, Shin-Etsu photosensitive silicone resist SINR-3410A manufactured by Shin-Etsu Chemical Co., Ltd. can be used.

Organic silicone resins that are cured at a low temperature in the range of 200° C. to 250° C. are preferred. Since the curing temperature of such an organic silicone resin is low, the GMR elements are not exposed at a high temperature during curing of the organic film 45 and characteristics of the elements are not affected.

The thickness of the organic film 45 formed is preferably at least 5 μm. Furthermore, a thickness in the range of about 5 to 10 μm is appropriate. When the thickness is less than 5 μm, interference fringes generated by variations in the film thickness due to a pattern shape are increased. In such a case, when image recognition of a wafer is performed in the subsequent wire-bonding process or the like, recognition failure may be caused, thereby affecting the productivity. Accordingly, the film thickness is preferably at least 5 μm.

A photosensitive material composed of a silicone resin is preferably used as the organic silicone resin. In this case, a predetermined shape can be easily formed by patterning using photolithography.

A method of producing the GMR angle sensor 1 including the protective layer 40, which is shown in FIGS. 2 to 4, will now be described.

First, an insulating layer 18 is formed on a substrate 11, and a multilayer film that exhibits the giant magnetoresistive effect is then formed on the entire surface of the insulating layer 18. The multilayer film is patterned so as to have a meandering shape as shown in FIG. 2 to prepare GMR elements 10. The multilayer film is prepared by forming, from the substrate side, an antiferromagnetic layer 12, a pinned magnetic layer 13, a nonmagnetic conductive layer 14, a free magnetic layer 15, and a cap layer 16 in that order.

Next, lead conductors 30 made of a good conductive material such as Cu are formed at either end in the longitudinal direction of the GMR elements 10.

Subsequently, an inorganic film 41 and an organic film 45 are sequentially laminated on the entire surface of the substrate including the GMR elements 10 and the lead conductors 30 to form a protective layer 40.

The inorganic film is formed by laminating two layers including an alumina film and a silica film. As alumina film 42 having a small thickness of about 1,000 Å is formed as an oxidation-preventing layer. A silica film 43 having a thickness in the range of about 3,000 to 4,000 Å is formed on the alumina film 42 so that the GMR elements 10 and the lead conductors 30 can be reliably insulated.

The organic film is formed by patterning a photosensitive material made of an organic silicone resin using photolithography, and curing the photosensitive material at 200° C. to 250° C. Thus, the organic film having a thickness of about 5 μm is formed on the inorganic film.

More specifically, when Shin-Etsu photosensitive silicone resist SINR-3410A manufactured by Shin-Etsu Chemical Co., Ltd. is used, the silicone resin is patterned in accordance with the following procedure.

The surface of a wafer on which the GMR elements are formed and the inorganic film is further formed is cleaned and then dried. Subsequently, the photosensitive silicone resist SINR-3410A is spin-coated with a coater. The wafer is then pre-baked on a hot plate at 150° C. for 120 seconds. The wafer is exposed with an exposure light source including the i-line, and post-exposure baking is then performed on a hot plate at 100° C. for 120 seconds. A spray development or a puddle development is performed using isopropyl alcohol (IPA) or the like, and IPA or the like is sprayed again to rinse the wafer. The formed pattern is subjected to a hard baking. In this embodiment, this hard baking can be performed at 250° C. or lower.

The protective layer is composed of a nonmagnetic material. This is because, if the protective layer is magnetic, the protective layer is magnetized by an external magnetic field and the GMR element does not function as a sensor.

In this embodiment, the protective layer 40 has a laminated structure including the inorganic film 41 and the organic film 45. Alternatively, the protective layer 40 may have a laminated structure composed of, for example, inorganic film/organic film/inorganic film.

As described above, a feature of the present invention lies in the protective layer of the GMR angle sensors 1, and the structure of the CIP GMR elements 10 is not particularly limited. The GMR elements 10 may have a single spin-valve structure as in this embodiment or a dual spin-valve structure. Furthermore, the GMR elements 10 may have a top spin-valve or a bottom spin-valve.

What is claimed is:

1. A GMR angle sensor for vehicles comprising:
a giant magnetoresistive element in which the element resistance is changed in response to an external magnetic field;
lead conductors connected to the giant magnetoresistive element; and
a protective layer that seals the giant magnetoresistive element and the lead conductors, wherein the protective layer has a laminated structure including:
an inorganic film provided on the giant magnetoresistive element and the lead conductors, which ensures that the giant magnetoresistive element and the lead conductors are sufficiently insulated; and
a silicone-based organic film provided on the inorganic film, and wherein the inorganic film comprises a silica ($SiO_2$) film and an oxidation-preventing film laminated on the lower surface of the silica film, the oxidation-preventing film being an alumina ($Al_2O_3$) film having a thickness smaller than a thickness of the silica film.

2. The GMR angle sensor for vehicles according to claim 1, wherein the organic film comprises a silicone-based photosensitive resin that can be cured at 200° C. to 250° C.

3. The GMR angle sensor for vehicles according to claim 1, wherein the organic film has a thickness of at least 5 μm.

4. The GMR angle sensor for vehicles according to claim 1, wherein the organic film is formed by patterning using photolithography.

5. The GMR angle sensor for vehicles according to claim 1, wherein the thickness of the silica film is 3,000Å or more and 4,000Å or less.

6. A GMR angle sensor for vehicles, comprising:
a giant magnetoresistive element formed on a substrate, a resistance of the giant magnetoresistive element being changed in response to an external magnetic field;
lead conductors formed on the substrate, the lead conductors connected to the giant magnetoresistive element; and
a protective layer formed on the giant magnetoresistive element and the lead conductors, the protective layer sealing the giant magnetoresistive element and at least part of the lead conductors,
wherein the protective layer has a laminated structure comprising:
an inorganic film provided on the giant magnetoresistive element and the lead conductors; and
a silicone-based organic film provided on the inorganic film, and wherein the inorganic film comprises:
an oxidation-preventing film formed on the giant magnetoresistive element and the lead conductors, and
a silica ($SiO_2$) film laminated over the oxidation-preventing film.

7. The GMR angle sensor for vehicles according to claim 6, wherein the organic film comprises a silicone-based photosensitive resin that can be cured at 200° C. to 250° C.

8. The GMR angle sensor for vehicles according to claim 6, wherein the organic film has a thickness of at least 5 μm.

9. The GMR angle sensor for vehicles according to claim 6, wherein the organic film is formed by patterning using photolithography.

10. The GMR angle sensor for vehicles according to claim 6, wherein the oxidation-preventing film is an alumina ($Al_2O_3$) film.

11. The GMR angle sensor for vehicles according to claim 6, wherein the oxidation-preventing film has a thickness smaller than a thickness of the silica film.

12. The GMR angle sensor for vehicles according to claim 6, wherein the substrate includes an insulation layer formed thereon below the giant magnetoresistive element and the lead conductors.

* * * * *